June 4, 1935.  E. GRAF  2,003,771
COIN TESTING DEVICE
Filed Nov. 22, 1933  2 Sheets-Sheet 1
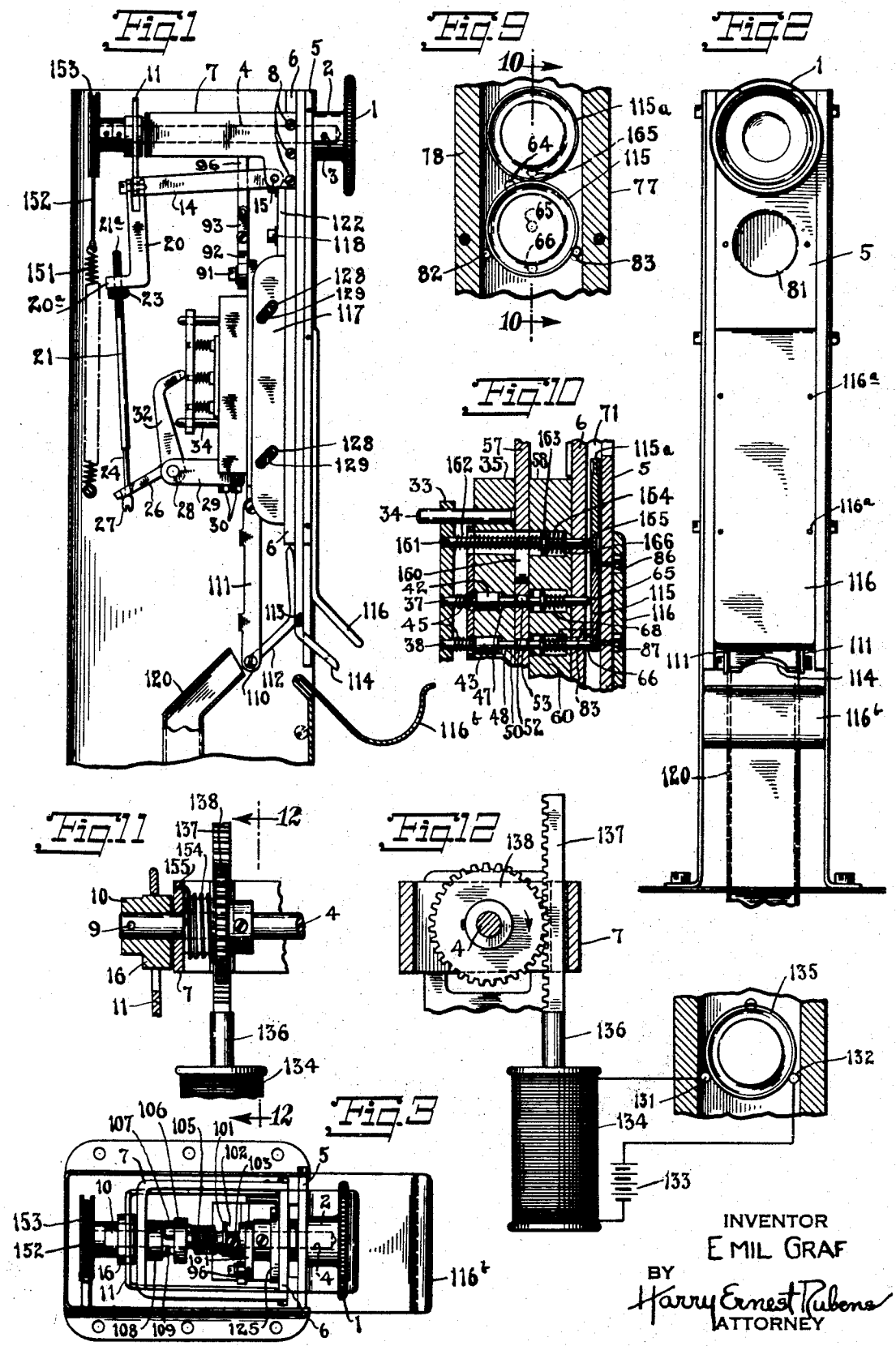
INVENTOR
EMIL GRAF
BY
Harry Ernest Rubens
ATTORNEY

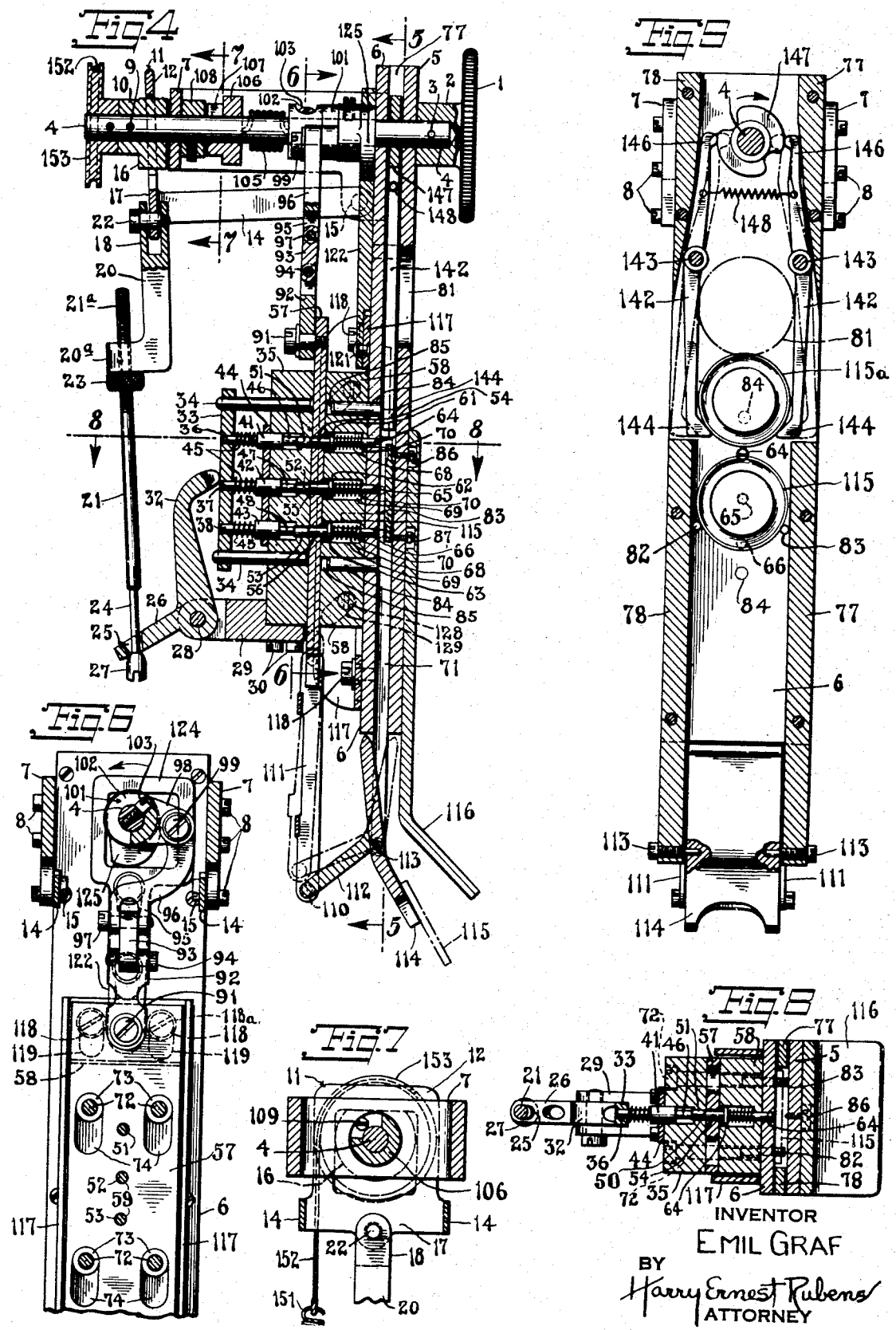

Patented June 4, 1935

2,003,771

UNITED STATES PATENT OFFICE 2,003,771

COIN TESTING DEVICE

Emil Graf, Jamaica, N. Y., assignor of one-half to Harry E. Rubens, New York, N. Y.

Application November 22, 1933, Serial No. 699,159

5 Claims. (Cl. 194—97)

My invention relates to novel apparatus for and methods of preventing frauds and more particularly relates to novel apparatus for and methods of testing coins or checks to determine whether or not they are legitimate or fraudulent.

Fraud preventing devices heretofore employed have operated on the principle of testing coins for some particular characteristic, such as its weight, the smoothness or lack of smoothness of the face of the coin, or its thickness and the like.

In all of these cases it is a relatively simple matter to produce fraudulent checks or coins which, while they have the one characteristic of the testing machine, are still sufficiently different therefrom in other characteristics as to prevent them from being legally held as fraudulent imitations. Accordingly, the fraud-preventing devices have accepted such fraudulent coins and to this extent have been inoperative for their intended purposes.

I have discovered that certain characteristics are common to a class of coins to such an extent that any unauthorized imitation of all of these characteristics would constitute counterfeiting. Possession of such coins would be criminal and their existance therefore extremely unlikely.

Thus, for example, the legal five cent piece has a predetermined diameter, thickness at the edges and center, rim around the circumferential edge, and groove adjacent this rim. All these characteristics, for example, are common to all legal five cent pieces and any existing check or coin having all these characteristics would be such a likeness that it would, I believe, come within the scope of a counterfeit.

A device, therefore, that could detect coins of these characteristics will be an effective means for selecting legal from fraudulent coins.

Accordingly, I have as the main object of my invention a novel method of and apparatus for testing coins and checks.

A further object of my invention is to provide novel apparatus for and methods of selectively accepting coins and checks of these characteristics and rejecting counterfeits.

Still a further object of my invention is to provide novel apparatus for and methods of selectively accepting coins in accordance with the joint result of a plurality of different examinations of the coin.

Still another object of my invention is to provide novel apparatus for and methods of simultaneously testing a plurality of different physical characteristics of a coin and jointly controlling selecting mechanism in accordance with all of these tests.

In testing coins, it is of considerable importance that the operators thereof shall not have access to the testing mechanism for the purpose of tampering with its normal operation—in fact, all testing should be independent of the operator.

Accordingly, a further object of my invention is to provide novel apparatus for performing the testing operations at an inaccessible position.

Still a further object of my invention is to provide novel apparatus for and methods of testing coins and checks in a predetermined manner independently of the human factor.

Still another object of my invention is to provide novel apparatus for and methods of testing coins, one at a time, regardless of the number of checks or coins inserted into the machine simultaneously.

There are other objects of my invention which together with the foregoing will appear in the detailed description which is to follow in connection with the drawings in which:

Figure 1 is a side view of one embodiment of the mechanism with part of the outer cover and top removed.

Figure 2 is a front view of the same.

Figure 3 is a top view of the mechanism with the top cover removed.

Figure 4 is a cross section of the mechanism.

Figure 5 is a cross section taken along the plane 5—5, shown in Figure 4 and in the direction indicated by the arrows.

Figure 6 is an elevation taken along the plane 6—6, and in a direction indicated by the arrows, and with parts of the mechanism removed.

Figure 7 is an elevation taken along the plane 7—7, and in a direction indicated by the arrows.

Figure 8 is a cross section taken along the plane 8—8, and in a direction shown by the arrows.

Figure 9 is a front view of the coins held in position in a modified form.

Figure 10 is a cross section taken along the plane 10—10, shown in Figure 9 and in the direction indicated by the arrows.

Figure 11 is a side view, partly in section of the solenoid attachment for operating the mechanism.

Figure 12 is an end view of the same with a schematic diagram of the electrical circuit and connections.

Referring now more specifically to Figure 4, my device suitably mounted in a casing (not shown) is provided with a knurled knob 1 having a collar 2 secured in any well known manner, as by pins 3 to a shaft 4. The shaft is supported for rotating near the collar 2 in plates 5 and 6 and its rear end by the U-shaped member 7 (Fig. 1) secured by screws 8 to the plate 6. Suitably mounted on the rear end of shaft 4 by pins 9 for rotation therewith is a cammed member 10, upon which rides the L-shaped member 11. Member 11 consists of a hollow rectangular frame cam follower 12 (Figure 7) and integral therewith and extending horizontally therefrom to form an L with frame 12, a lever 14 pivoted to the U-shaped member 7 at pivot 15.

When shaft 1 is rotated, it will in turn rotate shaft 4 and cam 10 and as the raised part 16 of the cam 10 comes into contact with the frame 12, the frame will be raised, carrying integral lever 14 about its pivot 15.

The under portion or extension 17 of the frame 12 extends between forked ends 18 of L-shaped member 20 and is secured to the fork 18 by a pin 22 extending through openings in the fork 18 and extension 17.

Depending from the member 20 is a connection rod 21, the upper end of which is threaded and screwed into the end 20a of the L member 20. The threaded portion 21a of the connecting rod 21 permits an adjustment of the mechanism as will appear more fully hereinafter and is arranged to be locked in adjusted position by lock and nut 23.

The lower end 24 of the connecting rod 21 is reduced in diameter and extends through a slot 25 of bell crank 26. Rod 21 is held in place by a screw head 27. Bell crank 26, pivoted at 28 on the ledge 29, is provided with an arm 32. The arm 32 of bell crank 26 normally rests against a guide plate 33 loosely mounted for sliding movement on guide pins 34 secured to rectangular plate 35 to the under surface of which is secured the ledge 29 by screw 30.

As will now be clear, the rotation of shaft 4 is translated through cam 12 into a linear vertical movement of L-shaped member 20. The movement of L-shaped member 20 in turn rocks bell crank 32 through link 21 and the rocking movement of bell crank 32 produces a linear movement of plate 33 along guide rods 34.

Loosely mounted in openings in the guide plate 33 and extending through openings in the rectangular plate 35 are three pins 36, 37 and 38. At the point where these pins enter rectangular plate 35, their diameter is enlarged as shown at 41, 42 and 43 respectively. The openings in the cover plate 44, mounted on the rectangular plate 35 and in the plate 35 are sufficiently enlarged to permit the enlarged sections of pins 41 to 43 to freely slide therein. Mounted about pins 36 to 38 and between the shoulder formed by the enlarged sections 41 to 43 and the inner face of plate 33 there are compression springs 45. As the plate 33 is moved inwardly by bell crank 26, the springs 45 are compressed and act against the shoulder of the enlarged sections 41 to 43, to slide the pins 36 to 38 to the right. The opposite ends 46 to 48 of pins 36 to 38 respectively are also of reduced diameter as shown in Figure 10, and engage the small cylinder-shaped members 51 to 53 respectively which slide in openings 50 in plate 35 of a diameter just sufficient to permit free sliding movement of the members 51 to 53. The opposite face of members 51 to 53 in turn engage individual pins 54 to 56 of slightly reduced diameter and extending through openings 59 in the sliding plate member 57 to be described in more detail hereinafter. Pins 54 to 56 enlarge to heads 61 to 63 respectively, of a diameter to permit free sliding movement in their individual cylinders 60. Heads 61, 62 and 63 of pins 54 to 56 in turn terminate in a reduced diameter in ends 64 to 66 respectively mounted in cylinders 69 in a second rectangular plate member 58. At the opposite end 70 of cylinders 69, there are openings of a diameter reduced just sufficiently to permit easy sliding movement of the pins 64 to 66. Interposed between the head formed at 70 and the heads 61 to 63 are compression springs 68 which normally force the pins 64 to 66 left to their normal non-operated position.

From the above, it will now be clear that normally springs 68 maintain pin ends 64 to 67 at their extreme left position, determined by the engagement of the heads 61 to 63. These in turn maintain pins 54 to 56 at their extreme left position in which they lie partly in sliding plate member 57 and partly in plate 35. Members 51 to 53, and in turn finally pins 36 to 38, are all at their extreme left positions with plate 33 actuated by spring 45. All extreme left positions are normally caused by action of springs 68.

When the pins 36 to 38 are moved to the right by plate 33 acting on springs 45, in the manner described above, they in turn engage and move members 51 to 53 to the right and these in turn acting through pins 54 to 56 move the last series of pin ends 64 to 66 to the right. These latter pin ends, which I shall refer to hereinafter as the feeler pins, function to measure predetermined physical characteristics of a coin against which they are thus compressed as will appear hereinafter. Before explaining the testing operation, however, the remaining mechanism will first be described in order that the effects of the testing operation may be clear.

The two plate members 35 and 58 are integrally fastened to each other by means of bolts 72 extending transversely through the two plates as shown in dotted construction in Figure 8. Spacers 73 encircle these bolts between the two plates, permitting the sliding member 57 to operate inbetween within the confines of the elongated slots 74, formed therein, as illustrated in Figure 6.

Extending from the plate 6, and securely attached thereto are two supporting pins 84, which extend into two closely fitting chambers 85 formed in plate 58, shown in Figure 4.

These pins 84 support the plate 58, preventing vertical motion and only permitting the plates 58 and 35 to be moved toward or away from plate 6, transversely. The plate member 6 is spaced from the plate member 5 and held secured thereto by elongated spacers 77 and 78 (Figure 8) and provides the coin channel 71 through which the coin is dropped for the purpose of being tested by the feeler pins 64 to 66, the coin being admitted into the channel by the opening provided therefor at 81.

Integrally secured to the rectangular plate member 58 and extending through openings in the vertical plate 6 are two coin supporting pin members 82 and 83 (Figures 5 and 8), 82 appearing in the dotted line in Figure 4 and sliding pin 83, which is just in back of it, being invisible. These pins serve to normally block the passage of coins which at least approximate the diameter of the coin to be tested through opening 81. The coin is thus brought to rest opposite the feeler pins 64 to 66 for the necessary test.

Feeler pin 64, as shown in Figure 4, is cut away at its end to form a right angle notch. As this feeler is forced to the right under action of the plate 33 acting through pin 36, this notched portion of the feeler 64 will move into engagement with the coin with the under edge of the notch slipping over the circumferential edge of the coin and the right angle notch tangentially engaging the top and also engaging the side of the coin. As will be obvious, the amount of material cut away to form the right angle notch need be only of just sufficient height to permit an engagement with the side and top of a coin of proper diameter. Feeler 64 thus cooperates with pins 82 and 83 to provide three points for defining the circumferential edge of a coin of a predetermined diameter. A slight variation in the diameter of the coin will either block the feeler 64 from movement to its correct right end position by resulting in engagement of the end of the pin with the side of the coin if the coin is larger than the predetermined diameter, or the coin will not be in the path of the feeler 64 at all if the coin is less than a predetermined diameter, permitting pin 64 to move too far to the right. Moreover, even in the case of a coin of the proper diameter, the point at which the feeler is brought to a stop in engaging the side of the coin is determined by the thickness of the coin at the circumferential edge. Thus, this feeler measures the diameter of the coin and its thickness along the circumference.

Feeler 65, when forced to the right, engages the midpoint on a coin of the proper diameter and the extent of its movement is accordingly controlled by the thickness of the coin at the center. Feeler 66 engages the coin at the groove or undercut of the coin formed near its circumferential edge as in the case of a five cent piece, so that the movement of its pins is controlled by the existence of the undercut near its rim.

As will now be clear, four measurements of the coin are made, namely, the diameter of the coin, its circumferential edge thickness, thickness at the center and existence of the undercut.

It will now be obvious that these are merely illustrative of my novel principle and that additional tests of a similar nature may be made such as the thickness at any other symmetrical point.

In order to adjust this movement of the feelers, two set screws 86 and 87 (Figure 4) are mounted in vertical plate 5 as shown and extend beyond the surface thereof to position the coin horizontally. These two set screws together with pins 82 and 83 thus together determine the horizontal resting position of the coin, and are useful for adjusting purposes.

If now the diameter of the coin is correct so that the notch in feeler 64 engages the circumferential edge of the coin and feeler 64 is brought to a stop at a predetermined position, member 51 is positioned in the opening in sliding plate 57, as seen in Figure 6. The length of the cylinder member 51 is exactly or substantially exactly equal to the thickness of the plate 57 and the remaining system of pins associated with member 51 are of such length that with feeler 64 in proper position, member 51 comes to rest so that it occupies all of the opening in plate 57 and is wholly within this opening. Similarly if the diameter at the center of the coin is exactly right, the feeler 65 will move to a distance which will position the member 52 wholly within and occupies all of the opening in slider member 57, the length of the cylinder 52 also being the same or substantially the same as the length of the opening in the sliding member 57. Finally, if the undercut around the coin is in the proper position and of proper depth, feeler 66 will move the necessary distance so that the member 53 is wholly within and occupies all of the opening of the sliding member 57, the length of member 53 also being equal or substantially equal to the length of the opening in the sliding member 57. With the cylinders 51 to 53 thus wholly occupying their respective openings in slider 57, slider 57 is free to be slid in a longitudinal direction with respect to plates 35 and 58 in a manner described below.

The edges of the pins 51, 52 and 53 are slightly rounded to permit slight variations in the test of the coin without preventing the sliding plate 57 from moving.

It should be further noted that in the event the coin being tested fails to meet any one of the conditions above described, that is if it is not of the proper diameter and therefore permits the feeler 64 to move too far or not far enough, or it is not of the proper thickness at the center so that the feeler 65 does not move the proper distance or the undercut is not of the proper depth or not properly placed, and feeler 66 does not move the correct distance or any combination of these, then the corresponding members 51 to 53 will come to rest so that they are partly in the openings in slide plate 57 and partly in the openings of either rectangular plate 35 or 58 depending upon the movement of the feeler pins. In that case slide plate 57 is blocked from sliding movement.

The manner in which the slide plate 57 is moved will now be described in detail. As shown, slide plate 57 is secured by means of screw 91 to forked member 92, (Figs. 4 and 6) to which is secured in turn link 93, the lower end of which fits between the fork of the member 92 and is partially secured by screw 94 and the upper end of which fits between fork 95 and link connection 96 and is secured by means of the screw 97. Link connection 96 in turn is mounted on pin 99 which is carried by the shaft lever 98. Lever 98 is integral with the collar member 101 loosely mounted on the shaft 4 and is partly cut away as is shown at 102 (Figure 3) to form a slot. Mounted in slot 102 and secured to rotate with the shaft 4 is screw member 103, the function of which will appear more clearly hereinafter. Secured at one end of the collar 101 and wound around the shaft 4 is a spring 105, the other end of which is secured to collar 106 loosely mounted on shaft 4 and having a projection shoulder 107. Adjacent to the projecting shoulder 107 and secured on the shaft for rotation therewith is the sleeve 108 from which protrudes a pin 109 so arranged that when sleeve 108 is rotated with shaft 4, pin 109 engages the shoulder 107.

The operation will now be clear. As the shaft 4 is rotated, pin 109 after a predetermined angular rotation of the shaft engages the shoulder 107 and rotates the collar 106. As the collar 106 is rotated, the spring 105 is tensioned and will in turn tend to rotate the collar member 101, and through the collar 101, shaft lever 98, screw 97, connecting link 96, links 93 and 92, will tend to raise the sliding plate 57. If the cylinders 51, 52 and 53 are all properly positioned within the openings in the sliding plate 57, the sliding rod 57 will then move upward and carry with it connecting frame 111 secured to the bottom of the slide member 57. As the connecting frame 111 is raised, it will rock the deflecting member 112, one end of which is secured to the bottom of connecting frame 111, at pin 110, about its pivot 113, supported by spacers 77 and 78, moving it from the position shown under the plate 6 to the position shown in dotted line under the plate 5 and the coin, accepted in a manner to be described, in dropping through channel 71 in the manner now to be described, is then deflected to the left into the coin operated mechanism not shown by the deflecting member 112.

In the event that cylinders 51 to 53 are not properly placed and block the movement of slide rod 57, then, as the shaft 4 is rotated and the spring 105 is tensioned, collar 101 will be prevented from rotating and the tension in the spring 105 will simply not be released. Slide rod 57 in that case, will of course, not move and the deflecting plate 112 will remain in the position shown in full under plate 6. A coin 115 shown in dotted lines (Figure 4) passing shown in the channel 71 will then be guided by the plate 114, secured to the spacing members 77 and 78 at pivot 113 and by the plate 116 secured in any well known manner to the outer plate 5, as by screws 116(a) in Figure 2. The coin is thus rejected into the receiving pocket 116b, shown in Figure 1.

The mechanism for releasing the coin after it has been tested in the manner described above will now be described.

In Figure 6, the sliding plate 57 is shown in front of a channel-shaped member 117, which partially encloses the rectangular plate member 58, interposed between the two. This channel-shaped member 117 slides vertically adjacent the plate 6, and its position is determined by a pair of upper and lower screws 118, extending through their respective elongated slots 119 located in the channel member 117 and secured to the plate member 6. Around the screws and slightly greater in thickness than the thickness of the channel member 117 are two pairs of spacers 118a which permit the free sliding of the channel member 117 within the length of the slots 119, without interference. The screws 118 have flat heads, wider than the width of the slots, holding the movement of the channel member 117 to a plane parallel to the plate 6.

The upper pair of screws and slots are shown in dotted construction, Figure 6, hidden behind the sliding plate 57, the lower pair not shown in Figure 6, but illustrated in Figure 4.

Between the upper and lower elongated slots 119, the channel member 117 is cut away at its web to permit the plate member 58 to lie flush against the plate 6, within the channel. Sufficient space is cut away to permit the channel member to be moved upwardly the length of the elongated slots without touching the lower end of the plate 58 as indicated in Figure 4 and Figure 8.

Near its upper end, the channel member 117 is dovetailed and secured as by a bolt 121 (Figure 4) to a link extension 122. Link 122 terminates in a hollow rectangular member 124 (Figure 6). A cam member 125 (Figure 4) secured for rotating with shaft 4 is seated in the hollow portion of the rectangular form member 124 so that as the shaft 4 is rotated counterclockwise in Figure 6 and the raised portion of cam 125 comes into contact with the upper rim of the frame member 124, the frame member and the parts attached thereto will be raised.

As the shaft 4 is rotated, cam 125 through the frame 124 carries link member 122 in a reciprocating up and down movement. The channel member 117 is also positioned relative to plate 58 as shown in Figure 1 by means of two pairs of screw members 128 which extend through elongated slots 129 in the two wings of channel member 117 from the plate 58 so that a longitudinal sliding movement of channel member 117 is similarly permitted. By reason of pins 84, rectangular members 85 and 58 are supported from the fixed plate member 6, but permitting a transverse movement without interfering with the vertical movement of the channel member 117 which causes plates 35 and 58 to move transversely as hereinafter explained.

As shown in Figure 1, the head of a screw member 128 extends from the sides of member 58 through sloping elongated slots 129 in the side of the channel member 117. As the channel member 117 is raised in the manner described above, screw members 128 with cam shaped heads are forced along the sloping slots 129 and thus carry members 35 and 58 in a transverse direction away from plate member 6 on tracks formed in pin chambers 85 moving on fixed pins 84. In this operation supporting fingers 82 and 83 (Figures 4 and 5), which normally hold the coin in position to be tested, are moved transversely with the member 58 from underneath the coin, the coin is thus released, dropping down through the opening 71 and being discharged either to the left over 112 or to the right over member 114, depending upon the previous alignments of member 114 in accordance with the test operation of the coin as already described. In the former case, that is with the coin test such that the coin is to be accepted by the machine, member 112 has been rocked to the dotted position and the coin is moved to the left into the directory chamber 120 leading to the coin operated mechanism not shown.

The operation of the device should now be obvious. With the mechanism in the position shown, and the knob 1 rotated to its maximum counterclockwise position, the apparatus is in the position shown in Figure 4.

In the normal non-operating position, bell crank 32 is in its counterclockwise position, as shown, and pins 54 to 56 extend across plate 57 and plate 58. This fixed the position of the plate 57 and in turn its connecting links to collar member 101. When, therefore, screw 103 engages the side of member 101 in the counterclockwise movement of shaft 4, the plate member 57 is brought to its starting position as shown in Figure 4, its final position determined by the elongated slots 74 acting on the screws 72 and spaces 73. This prevents the further rotation of the shaft 4, and is the normal non-operating position of the shaft. In this position, the flat part of cam 10 is in a horizontal position and at its top. Frame 11 is resting on this flat surface, so that the frame is in its lowermost position and the connecting links therefrom to bell crank 32 are in their lowermost positions which places the bell crank in its most counterclockwise position as related heretofore. Cam 125 is in the position shown in Figure 6 with its flat surface in a vertical position and the lowermost portion of the cam in engagement with frame 124. Frame 124 and all parts connected thereto including channel member 117 are accordingly in their lowermost position. Plates 35 and 58 are accordingly in their exterme right position with fingers 82 and 85 in position to receive and support a coin.

With the apparatus thus in normal position, a coin is inserted in the opening 81 and drops through the channel formed by the members 77 and 78 and comes to rest on the supporting fingers 82 and 83. The knob 1 is now rotated in a clockwise direction. The cam 10 is so arranged with respect to all the other cams on shaft 4 that this cam is the first to operate by causing its elevated portion 16 to engage and raise frame 11. As already described in detail, a movement is thus transferred through members 20, 21, 26, 32, etc., to move the feeler pins 64, 65 and 66 to the right and against the side of the coin to be tested. The testing operation of these three fingers has already been described in detail, and as already explained heretofore, if all other tests performed indicate a legitimate coin, members 51 to 53 are so positioned that the plate 57 is free to slide vertically with respect to plates 35 and 58. As the knob 1 continues to rotate shaft 4, pin 109 acts on collar 106 to spring 105, the increasing tension on spring 105 becomes sufficient to rotate sleeve collar 101 which in turn through link members 93, 92 and 91 operates to slide member 57 vertically and pivoted deflecting member 112 is rocked to the dotted position, conducting coin through channel 120.

On further movement of knob 1, the raised portion of cam 125 engages frame 124. Frame 124 is raised and in turn operates member 122 to raise the channel member 117. As the channel member 117 rises in the manner described in detail hereinbefore, raising the sloping slots 129, members 35 and 58 are moved transversely along the tracks formed by pins 84 removing the supporting fingers 82 and 83 from the coin which has already been tested and permitting the coin to be dropped through channel 71. The coin is then accepted by the machine, if the test as described above indicated a correct coin by permitting member 57 to be raised and deflecting member 112 to be rocked clockwise, or the coin is rejected, if member 57 was unable to move upwardly so that member 112 remained in the position shown.

When a coin is inserted into the machine before a preceding coin has been tested, it is desirable to maintain the second coin from interfering with the testing operation of the first coin. To this end two pivoted levers 142 mounted on spindles 143 respectively, are provided at the lower ends with lug extensions 144. Members 142 are mounted along sides in the channel formed between plates 5 and 6 as shown in Figure 5. The members 142 are further provided with cam followers 146 which are normally held in engagement with the surface of cam 147 mounted on shaft 4 by means of spring 148 which is connected to both of lever members and urges them towards each other. Cam 141 is so mounted on shaft 4 and is in such relation with the remaining cams that near the completion of the rotation of shaft 4 and after the supporting fingers 82 and 83 have released the preceding coin and have been returned to their original supporting position, the depressed portion of cam 147 comes opposite the followers 146. Followers 146 under the action of spring 148 force the depressed portion of the cam to rock their respective levers 142 about their pivots 143, moving lugs 144 out of engagement with the coin being held. The coin is thus permitted to drop into engagement with the supporting pins 82 and 83 in preparation for the test. As shown, the depressed portion of cam 147 occupies only a relatively small portion of the circumference of the cam, so that the followers, almost immediately after release of the coin, are moved by the raised portion of the cam to again present lugs 144 for intercepting a coin while the preceding coin is being tested.

In Figure 10 is shown a modification of the mechanism for testing coins successively as indicated above.

This consists in providing an additional pin 161 operating in the chamber 164 and extending through plates 35, 57, and 58. Inasmuch as plate 57 slides longitudinally, a chamber 160 is provided therein allowing the plate 57 to move longitudinally to its extreme position without interfering with the operation of the pin 161. The pin is provided with an enlarged portion 163 which gives it transverse support aided by the extreme right end 165 of the pin as it enters the plate 6 to support the coin 115a in the passage 71.

When the plate 33 is propelled to the right because of the movement of the bell crank 32, the spring 162 encircling the pin 161 acts on the pin at 163 and propels it to the right against the action of the spring 166, forcing 165 against the coin 115a holding it in position while the coin below is being tested. After the test has been completed, the bell crank 32 releases the plate 33, permitting the spring 166 to force the pin 161 back to its left position releasing the coin 115a to be tested.

In Figure 10 the remaining mechanism shown is that normally used as indicated in Figure 4.

In Figure 9, the pin 64, normally in a vertical line, is shifted slightly to the left to permit its operation without interference with the coin adjacent. Pin end 165 is shown in its relative position behind the coin 115a.

Although for purposes of illustration I have shown a preferred form of my invention, it will be obvious that the principle which fundamentally embodies testing the essential characteristics of a legitimate coin and the positive and direct operation as a result of this test, may be carried out with modified structures which still come within the invention herein described.

Thus it will be obvious that instead of manual operation of the knob 1, I may provide an electrical operation as illustrated in Figure 12 in which the electrically insulated supporting pins 131 and 132 equivalent to the supporting pins 82 and 83 of Figure 5 are electrically connected through a battery 133 to a solenoid magnet 134. When a coin is dropped through the channel in the manner described above and comes to rest as shown at 135, a circuit is completed through the coin to operate magnet 134. Integral with the plunger 136 of magnet 134 is a ratchet member 137, the teeth of which mesh with the teeth of spindle 138 which is secured to and rotates shaft 4. As the magnet is energized and pulls plunger 136 towards itself, ratchet 137 will rotate spindle 138 and the shaft 4 for performing the testing and accepting or rejecting operations described above.

Following the completion of a test operation and the acceptance or rejection of the coin, it is necessary, of course, to restore the apparatus to normal. In the case of the first modification illustrated, this is accomplished by a spring 151, one end of which is secured to the frame, the other end of which is secured to a flexible member 152 extending over a pulley 153 secured to and rotating shaft 4. Member 152 is affixed to pulley 153 in any well known manner. As the shaft 4 is rotated clockwise spring 151 is tensioned and when knob 1 is released at the completion of all operations, the shaft 4 under the action of spring 151 is rotated counterclockwise to its original position.

In the case of the second modification, as the solenoid operates shaft 4, a spiral spring member 154 (Figure 11), one end of which is secured to frame 155 or member 7 is tensioned in the manner described above, as solenoid 134 rotates the shaft. Following the test described above, and the proper operation of the coin deflecting member accepting or rejecting the coin, members 35 and 58 are moved transversely. Coin supporting pins 131 and 132 are withdrawn and the circuit for magnet 134 is opened. Therefore, spring 154 becomes effective to rotate shaft 4 in a counterclockwise direction back to its normal position.

Although for purpose of illustration I have shown my invention as applied to mechanical operation, it will be clear to those skilled in the art that I may also perform my operations electrically. Thus, for example, I may arrange my feeler pins 64 to 66 so that when properly positioned by a coin being tested, an electrical circuit is completed to a magnet which operates deflecting member 112. Similarly, although I have illustrated a specific manner of applying power for moving the feeler pins, it will be obvious that this is merely for purpose of illustration and that I may use any other well known method such as an electrical operation rendered operative automatically, when a coin is inserted for directly applying power to these feeler pins. These modifications are obvious expedients for carrying out my invention which primarily resides in the operation of the feeler pins for coin testing and the direct automatic and joint control by these pins of a selector for either accepting or rejecting the coin.

Accordingly, I do not want to be limited by the specific illustrations of my invention herein given, but only as set forth in the appended claims.

I claim:

1. In a coin testing device; means for receiving a coin to be tested comprising a pair of pins arranged to position said coin in a predetermined position; a third pin; means for moving said third pin towards said coin, said three pins locating three points defining the diameter of the class of coins to be tested; selecting mechanism operative in the event that the circumferential edge of said coin includes said three points for arranging to selectively accept said coin, said third pin having a notched end for defining the third position of the circumferential edge of the predetermined coin having a predetermined diameter and also defining the thickness of the coin at the circumferential edge.

2. In a coin testing device; means for receiving a coin to be tested comprising a pair of pins arranged to position said coin in a predetermined position; a third pin; means for moving said third pin towards said coin, said three pins locating three points defining the diameter of the class of coins to be tested; selecting mechanism operative in the event that the circumferential edge of said coin includes said three points for arranging to selectively accept said coin, said third pin having a notched end for defining the third position of the circumferential edge of the predetermined coin having a predetermined diameter and also defining the thickness of the coin at the circumferential edge; a fourth pin cooperating with said third pin for defining the thickness of the coin at a further position which is symmetrical irrespective of the angular insertion of said coin.

3. In a coin testing device; means for receiving a coin to be tested comprising a pair of pins arranged to position said coin in a predetermined position; a third pin; means for moving said third pin towards said coin, said three pins locating three points defining the diameter of the class of coins to be tested; selecting mechanism comprising feeler pins located solely on one side of said coin and operative in the event that the circumferential edge of said coin includes said three points for arranging to selectively accept said coin, said third pin having a notched end for defining the third position of the circumferential edge of the predetermined coin having a predetermined diameter and also defining the thickness of the coin at the circumferential edge.

4. In a coin testing device; means for receiving a coin to be tested comprising a pair of pins arranged to position said coin in a predetermined position; a third pin; means for moving said third pin towards said coin, said three pins locating three points defining the diameter of the class of coins to be treated; selecting mechanism comprising feeler pins for determining the characteristics of said coin which are common to both sides and operative in the event that the circumferential edge of said coin includes said three points for arranging to selectively accept said coin, said third pin having a notched end for defining the third position of the circumferential edge of the predetermined coin having a predetermined diameter and also defining the thickness of the coin at the circumferential edge.

5. In a coin testing device; means for receiving a coin to be tested comprising a pair of pins arranged to position said coin in a predetermined position; a third pin; means for moving said third pin towards said coin, said three pins locating three points defining the diameter of the class of coins to be tested; selecting mechanism operative in the event that the circumferential edge of said coin includes said three points for arranging to selectively accept said coin, said third pin having a notched end for defining the third position of the circumferential edge of the predetermined coin having a predetermined diameter and also defining the thickness of the coin at the circumferential edge; said selecting mechanism including a fourth pin for measuring the thickness of the coin at the center.

EMIL GRAF.